US00RE37834E

(19) United States
(12) Reissued Patent
Yamashita

(10) Patent Number: US RE37,834 E
(45) Date of Reissued Patent: Sep. 10, 2002

(54) MAGNETIC ROLL AND METHOD OF PRODUCING SAME

(75) Inventor: Keitaro Yamashita, Kamisato-machi (JP)

(73) Assignee: Hitachi Metals, Ltd., Tokyo (JP)

( * ) Notice: This patent issued on a continued prosecution application filed under 37 CFR 1.53(d), and is subject to the twenty year patent term provisions of 35 U.S.C. 154(a)(2).

(21) Appl. No.: 09/014,032

(22) Filed: Jan. 27, 1998

Related U.S. Patent Documents

Reissue of:
(64) Patent No.: 5,583,473
Issued: Dec. 10, 1996
Appl. No.: 08/309,740
Filed: Sep. 21, 1994

(30) Foreign Application Priority Data

Sep. 21, 1993 (JP) ..... 5-235049

(51) Int. Cl.[7] ..... H01F 7/00
(52) U.S. Cl. ..... 335/303; 335/251; 492/18
(58) Field of Search ..... 335/303, 302, 335/306; 355/251.1; 492/18, 22, 25, 47

(56) References Cited

U.S. PATENT DOCUMENTS 4,752,530 A * 6/1988 Yamada et al. ..... 428/425.9
5,319,337 A 6/1994 Matsunari et al.
5,479,246 A 12/1995 Suketomo

FOREIGN PATENT DOCUMENTS

JP 231766 8/1990
JP 537331 6/1993

* cited by examiner

*Primary Examiner*—Lincoln Donovan
(74) *Attorney, Agent, or Firm*—Antonelli, Terry, Stout & Kraus, LLP

(57) ABSTRACT

[The magnet roll according to the present invention comprising a cylindrical resin-bonded magnet, a first shaft formed by injection molding integrally with the cylindrical resin-bonded magnet at one end thereof, and a second shaft press-fitted into a bore of the cylindrical resin-bonded magnet at the opposite end thereof.] *A magnetic roll comprises a cylindrical resin-bonded magnet made primarily of a ferromagnetic powder and a thermoplastic resin having a modulus of longitudinal elasticity of at least* $2\times10^4$ *kg/cm*$^2$, *a first shaft formed by injection molding integrally with the cylindrical resin-bonded magnet at one end thereof, and a second shaft made of a rigid conductive material and press-fitted into a bore of the cylindrical resin-bonded magnet at the opposite end thereof. The bore has a splined cross section, the second shaft provided with a base portion having a splined cross section complimentary to that of the bore, and the base portion is inserted into the bore. The ferromagnetic powder is made of at least one selected from the group consisting of barium ferrite, strontium ferrite, a rare earth-cobalt alloy and a rare earth-iron-boron alloy, and the thermoplastic resin is at least one selected from the group consisting of nylon-6, nylon-12 and nylon-66.*

20 Claims, 3 Drawing Sheets

MAGNETIC ROLL AND METHOD OF PRODUCING SAME

Matter enclosed in heavy brackets [ ] appears in the original patent but forms no part of this reissue specification; matter printed in italics indicates the additions made by reissue.

BACKGROUND OF THE INVENTION

The present invention relates to a magnet roll for use as a delivery means for a magnetic developer in an electrophotographic apparatus, an electrostatic recording apparatus etc., and a method of producing the magnet roll. Particularly, the present invention relates to a magnet roll which does not suffer from breakage or cracking, and a method of producing the magnet roll in which a cylindrical resin-bonded magnet is formed by injection molding integrally with one shaft and the other shaft is press-fitted into a bore of the cylindrical resin-bonded magnet at the opposite end, thereby reducing the number of manufacturing steps and production cost.

In conventional electrophotographic apparatus, electrostatic recording apparatus, etc., a magnet roll used as a developing roll or a cleaning roll generally has a structure as shown in FIG. 4. The magnet roll 1 comprises a cylindrical permanent magnet 2 such as a resin-bonded magnet provided with a plurality of magnetic poles (not shown) on an outer surface thereof, and a shaft 3 coaxially secured into a central bore extending axially through the cylindrical permanent magnet 2.

A pair of flanges 4, 5 are rotatably mounted to the opposite ends of the shaft 3 via bearings 6, 6. A hollow cylindrical sleeve 7 is fixed to the flanges 4, 5 to surround the cylindrical permanent magnet 2. Incidentally, the flanges 4, 5 and the sleeve 7 are made of a non-magnetic material such as aluminum alloys, stainless steel, etc.

In case the magnet roll 1 is employed in the developer roll 8 as shown in FIG. 4, the magnet roll 1 and the sleeve 7 rotate relative to each other. For instance, the magnet roll 1 is kept stationary while the sleeve 7 secured to the flanges 4, 5 are allowed to rotate relative to the magnet roll 1. By this construction, a magnetic developer is attracted onto an outer surface of the rotating sleeve 7 by a magnetic attraction force of the cylindrical permanent magnet 2 and conveyed into a developing region for carrying out the development of an electrostatic latent image on an image-bearing member (not shown) to obtain a developed toner image. Incidentally, the magnetic developer is usually of a one-component type including a magnetic toner, or of a two-component type including a toner and a magnetic carrier.

In the magnet roll 1 described above, the cylindrical permanent magnet 2 is generally made of a sintered magnet such as a ferrite magnet, or a resin-bonded magnet. The resin-bonded magnet is primarily used when the weight reduction of the developer roll 8 is desired. When the cylindrical permanent magnet 2 is made of a resin-bonded magnet, the magnet roll 1 is produced, for instance, by (1) blending a ferromagnetic powder (usually ferrite powder) and a polymer material (usually rubber or plastics) to prepare a mixture, (2) charging the mixture into a cavity of an injection-molding die, in which the shaft 3 as an insert is held in place, to shape a cylindrical resin-bonded magnet 2 fixed to the shaft 3 while applying a magnetic field thereto, (3) cooling and solidifying the cylindrical resin-bonded magnet 2 in the die and then removing an integral body composed of the cylindrical resin-bonded magnet 2 and the shaft 3 from the die, and (4) magnetizing the integral body in the anisotropic direction to form magnetic poles on the cylindrical resin-bonded magnet 2, thereby obtaining the magnet roll 1.

A variety of thermoplastic resin materials have been used to form the cylindrical resin-bonded magnet 2 of the magnet roll 1. However, since the cylindrical resin-bonded magnet 2 is of such an elongated shape that a ratio of a length L to a diameter $D_1$ is 3 or more, a crystalline resin having a modulus of longitudinal elasticity of $1\times10^5$ kg/cm$^2$ or higher should be generally utilized to prevent the deformation of the cylindrical resin-bonded magnet 2 and reduce the molding time.

When the electrostatic latent image is developed, it is necessary to apply a bias voltage to the sleeve 7 of the developer roll 8 to prevent fogging on a recording medium or to achieve a reversal development. For this reason, the shaft 3 is generally made of a metal such as steel, stainless steel, etc. and is connected at one end thereof, for instance at an end adjacent to the flange 4, to a voltage source so that a necessary bias voltage is applied via the shaft 3 and the bearings 6, 6, such as sintered bearings, roller bearings, etc. to the sleeve 7.

However, in the magnet roll having such a structure, it is likely that the cylindrical resin-bonded magnet 2 breaks or cracks in its boundary region with the shaft 3 due to a large difference in coefficient of linear expansion therebetween. For instance, the shaft 3 made of steel has a coefficient of linear expansion of $1.1\times10^{-5}$ cm/cm/° C. and the cylindrical resin-bonded magnet 2 has a coefficient of linear expansion of about $3\text{–}4\times10^{-5}$ cm/cm/° C. (refer to Japanese Patent Publication No. 5-37331). When heated during the injection-molded process and thereafter cooled, the integral body is caused to shrink in the axial direction. In this case, a shrinkage of the cylindrical resin-bonded magnet 2 is larger than that of the shaft 3 so that breakage or cracking is likely to take place in a boundary region between the cylindrical resin-bonded magnet 2 and the shaft 3. Particularly, when the size of the magnet roll 1 is reduced, the thickness of the cylindrical resin-bonded magnet 2 must be reduced correspondingly, for instance, to such an extent that a ratio of an inner diameter $D_2$ to an outer diameter $D_1$ is 0.4 or more. As a result, the tendency of breakage or cracking is further accelerated.

OBJECT AND SUMMARY OF THE INVENTION

Accordingly, an object of the present invention is to provide a magnet roll having an enhanced resistance to breakage or cracking with easiness of applying a bias voltage to a sleeve.

Another object of the present invention is to provide a method of producing such a magnet roll.

To achieve the above objects, in the first aspect of the present invention, there is provided a magnet roll comprising a cylindrical resin-bonded magnet made primarily of a ferromagnetic powder and a thermoplastic resin having a modulus of longitudinal elasticity of *$2\times10^4$ kg/cm$^2$ or more, such as* $1\times10^5$ kg/cm$^2$ *or more*, a first shaft made of the same material as that of the cylindrical resin-bonded magnet and integrally formed at one end of the cylindrical resin-bonded magnet by injection molding, and a second shaft made of a rigid conductive material and press-fitted into a bore of the cylindrical resin-bonded magnet at the opposite end.

In the second aspect of the present invention, there is provided a method of producing a magnet roll composed of a cylindrical resin-bonded magnet made of a ferromagnetic powder and a thermoplastic resin having a modulus of longitudinal elasticity of $2\times10^4$ *kg/cm*$^2$ *or more, such as* $1\times10^5$ kg/cm$^2$ *or more*, and first and second shafts concentrically projecting from opposite ends of the cylindrical resin-bonded magnet, comprising the steps of (a) mixing the ferromagnetic powder with the thermoplastic resin to prepare a mixture; (b) charging the mixture into an injection-molding die to produce an integrally shaped body of the cylindrical resin-bonded magnet having a first shaft concentrically projecting from one end of the cylindrical resin-bonded magnet and a bore at the other end thereof; (c) removing the integrally shaped body from the injection-molding die; (d) press-fitting a separately prepared second shaft made of a rigid conductive material into the bore of the cylindrical resin-bonded magnet; and (e) placing the cylindrical resin-bonded magnet in a magnetic field to form a plurality of magnetic poles on an outer surface of the cylindrical resin-bonded magnet.

Since the magnet roll according to the present invention has such a structure that the first shaft is integrally formed at one end of the cylindrical resin-bonded magnet by injection molding, while the second shaft is press-fitted into a bore of the cylindrical resin-bonded magnet at the opposite end, the magnet roll does not suffer from breakage or cracking due to difference in coefficient of shrinkage between the cylindrical resin-bonded magnet and the shaft. Further, since the second shaft is made of a rigid conductive material, a bias voltage can be effectively applied to a sleeve via bearings and flanges.

DETAILED DESCRIPTION OF THE INVENTION

The present invention will be described in detail below referring to the attached drawings.

Figure 1A:
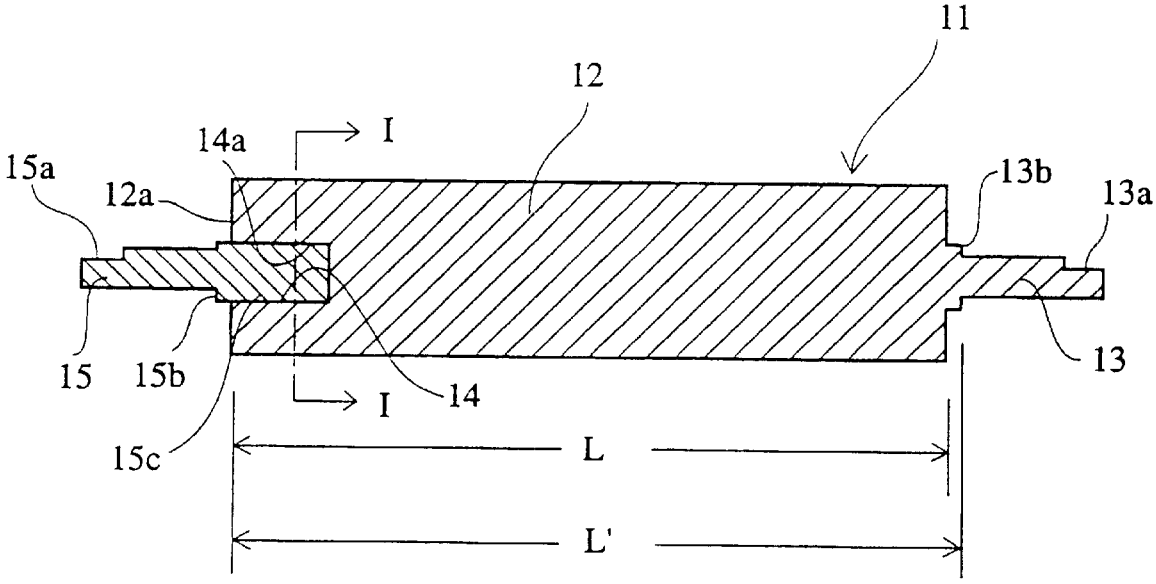
FIG. 1(a) is a longitudinal cross-sectional view showing a magnet roll according to the present invention.
Figure 1B:
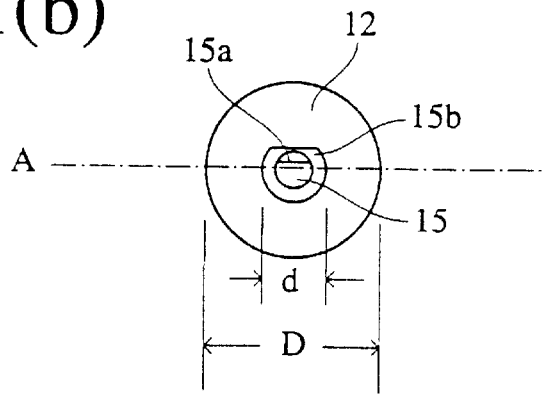
FIG. 1(b) is a left side view of the magnet roll shown in FIG. 1(a)
Figure 1C:
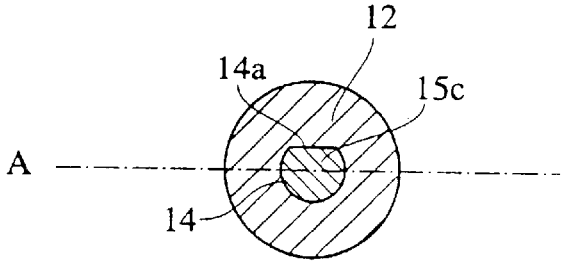
FIG. 1(c) is a cross-sectional view taken along the line 1—1 of FIG. 1(a)

Referring to FIGS. 1(a) through 1(c), there is shown a magnet roll 11 according to the present invention. The magnet roll 11 comprises a cylindrical resin-bonded magnet 12, at one end (a right end in FIG. 1(a)) of which a first shaft 13 is integrally formed. The cylindrical resin-bonded magnet 12 is provided, at the opposite end thereof (a left end in FIG. 1(a)), with a bore 14 into which a second shaft 15 separately prepared is pressure-fitted. As best seen from FIG. 1(c), the bore 14 may have a partially cut-away circular or a crescent cross section (splined cross section). A base portion 15c of the second shaft 15 which is inserted into the bore 14 also has a partially cut-away circular, or crescent, cross section (splined cross section) which is substantially the same as that of the bore 14, so that the second shaft 15 is press-fitted into the bore 14. The splined cross sections of the bore 14 and the base portion 15c of the second shaft 15 serve to prevent the rotation of the second shaft 15.

As mentioned above, in the magnet roll according to the present invention, the cylindrical resin-bonded magnet 11 and the first shaft 13 are integrally formed from a composition composed of a ferromagnetic powder and a thermoplastic resin.

Suitable materials of the ferromagnetic powder include barium ferrite, strontium ferrite, rare earth-ferromagnetic materials such as a rare earth-cobalt alloy (R—Co) and a rare earth-iron-boron alloy (R—Fe—B), etc. An average particle size of the ferromagnetic powder is preferably in the range of 0.3–5 $\mu$m to obtain high magnetic properties, moldability and productivity.

The ferromagnetic powder may be coated with an organic silicon compound (silane coupling agent), etc., an organic titanate compound (titanium coupling agent), etc. to improve the wettability of the ferromagnetic powder.

To obtain the desired magnetic properties, a proportion of the ferromagnetic powder is 85 weight % or more based on the total amount of the cylindrical resin-bonded magnet 12. However, when the proportion of the ferromagnetic powder exceeds 91 weight %, the mechanical strength and moldability of the cylindrical resin-bonded magnet 12 become low due to insufficient content of a resin component. Therefore, the proportion of the ferromagnetic powder is preferably in the range of 85–91 weight %.

Suitable materials for the thermoplastic resins may be any known thermoplastic resin such as polyamide, polycarbonate, polyphenylene sulfide, etc. However, since the first shaft 13 is integrally formed with the cylindrical resin-bonded magnet 12, it is preferable to employ the thermoplastic resins having a high mechanical strength and a high wear resistance. Specific examples of such thermoplastic resin include, for instance, polyamides such as nylon-6, nylon-12, nylon-66, etc.

The molding composition for the cylindrical resin-bonded magnet 12 and the first shaft 13 may further contain a slip agent such as polyethylene wax and calcium stearate, a plasticizer such as phthalates, an anti-oxidizing agent such as aromatic amines, etc. alone or in combination in as small a proportion as 1 weight % or less.

The molding composition composed of the ferromagnetic powder and the thermoplastic resin may be mixed together by a kneader while heating to obtain a mixture (compound) which is used in an injection-molding process.

The second shaft 15 may be separately prepared by a casting method, a machining method, etc. Suitable materials for the second shaft 15 are rigid conductive materials such as metals. Preferably, the second shaft 15 is made of steel, stainless steel, etc. to make it possible to apply a bias voltage to the sleeve 18.

The magnet roll 11 may be produced by an injection-molding method using a vertical-type split die (for instance, refer to Japanese Patent Publication No. 3-18723). The vertical-type split die may be composed of a movable die segment and a stationary die segment parting from each other at a parting surface in parallel to an axis of the magnet roll to be molded. Preferably, the magnet roll 11 can be produced by using a split die of a type shown in FIG. 2 and having a parting surface extending axially so as to pass through the axis of the magnet roll to be molded, as indicated by a broken line A in FIG. 2. In a case where such a split die having the axially extending parting surface is employed, the mixture is preferably injected into a die cavity from one end of the die. This ensures a dimensional accuracy of a distance (L') between an end surface of a shoulder portion 13b of the first shaft 13 and an end surface 12a of the cylindrical resin-bonded magnet 12 as shown in FIG. 1(a), because these end surfaces can be produced in the same stationary die segment.

Figure 2:
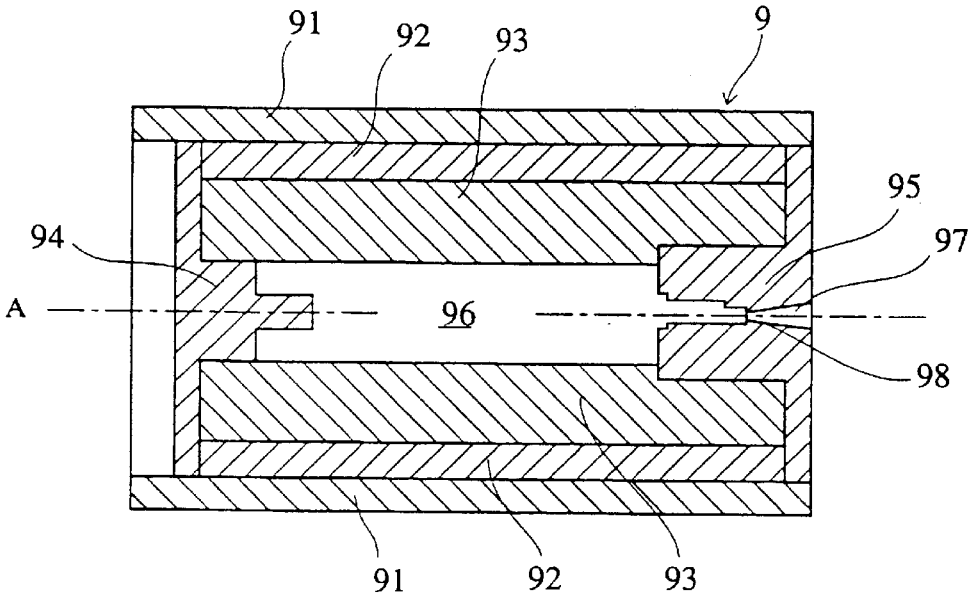
FIG. 2 is a sectional view showing an injection-molding die for producing the magnet roll according to the present invention.

The split die 9 shown in FIG. 2 includes a base 91, a cylindrical outer shell 92 fitted into the base 91, a cylindrical inner shell 93 fitted into the outer shell 92 and end plates 94, 95. The outer shell 92 may be made of a magnetic material, while the inner shell 93 and end plates 94, 95 may be made of a non-magnetic material. A die cavity 96 is defined by an inner surface of the inner shell 93 and the end plates 94, 95. A magnetic field-generating means (not shown) may be disposed in the inner shell 93 to magnetize the shaped body at the desired intervals during the injection-molding process. Incidentally, the end plate 95 is provided with a runner 97 communicating with a sprue (not shown), and a gate 98.

After the shaped body is removed from the die 9, the shaft 15 made of a rigid conductive material such as steel is press-fitted into the bore 14 of the cylindrical resin-bonded magnet 12. As described hereinbefore, the bore 14 has a partially cut-away circular, or crescent, cross section (splined cross section) so as to provide a flat inner surface 14a extending in the axial direction, and the shaft 15 is provided with a flat surface mating with the flat surface 14a of the bore 14. When the shaft 15 is fitted into the bore 14, the mating of these flat surfaces serves to ensure the fixing of the shaft 15 to the cylindrical resin-bonded magnet 12, thereby preventing the rotation of the second shaft 15.

The magnet roll 11 thus produced is placed in a magnetic field for magnetization. The [opposite shafts 13, 15] *shaft 15 is* are further provided with [flat portions 13a, 15a] *a flat portion 15a* which [extend] *extends* axially on [outer surfaces] *an outer surface* of the [shafts 13, 15, respectively] *shaft 15*. The [flat portions 13a, 15a] *flat portion 15a* may be formed by a proper machining method such as a surface grinding method. [However, as] *As* shown in FIG. 2, the [flat portion 13a] *shaft 13* is preferably formed by injection molding [to eliminate the subsequent machining process]. The [flat portions 13a, 15a function as reference surfaces] *flat portion 15a functions as a reference surface* for positioning the magnet roll 11 in a magnetic field in which the cylindrical resin-bonded magnet 12 is magnetized. The [flat portions 13a, 15a ensure] *flat portion 15a ensures* that the magnet roll 11 is held in place in the magnetic field to accurately produce respective magnetic poles at intended positions on the cylindrical resin-bonded magnet 12. The [flat portions 13a, 15a] *flat portion 15a* also [serve as reference surfaces] *serves as a reference surface* for positioning the magnet roll 11 when it is installed in a developing device or a cleaning device of an electrophotographic apparatus.

Figure 3:
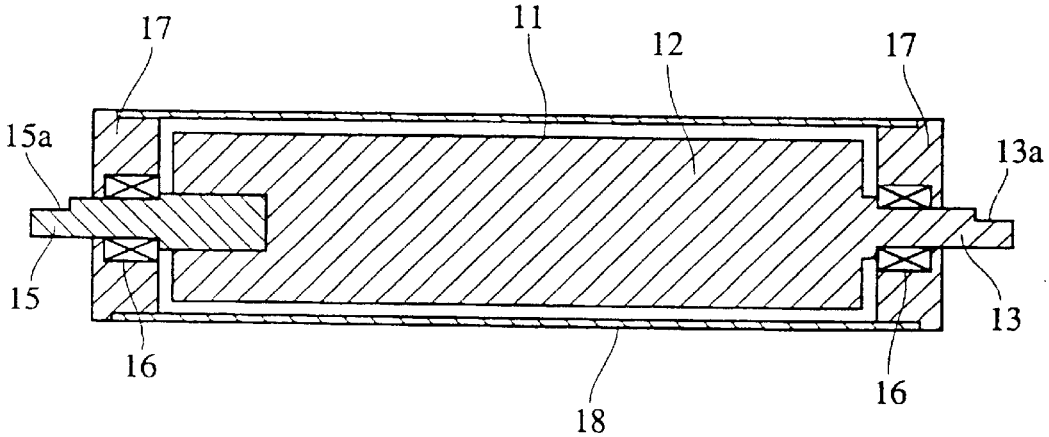
FIG. 3 is a longitudinal cross-sectional view showing a developing roll assembly equipped with the magnet roll according to the present invention.
Figure 4:
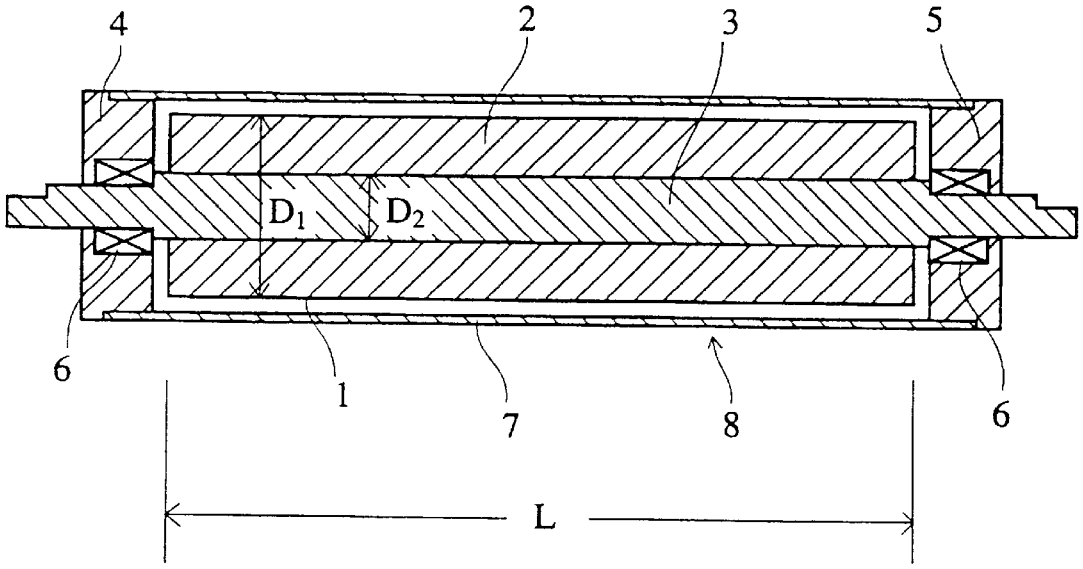
FIG. 4 PRIOR ART
FIG. 4 is a longitudinal cross-sectional view showing a conventional magnet roll.

Shown in FIG. 3 is a magnet roll assembly such as a developing roll unit or a cleaning roll unit, into which the magnet roll 11 produced above is incorporated in the same manner as shown in FIG. 4. Namely, a pair of flanges 17, 17 are rotatably mounted via bearings 16, 16 to the first and second shafts 13, 15, respectively of the magnet roll 11. A hollow cylindrical sleeve 18 is fixed to the flanges 17, 17 to surround the magnet roll 11. When mounted to the first and second shafts 13, 15, the bearings 16, 16 are in rotatable contact with the shoulder portions 13b and 15b of the first and second shafts 13, 15, respectively, thereby attaining a dimensional accuracy of the assembly. Incidentally, the flanges 17, 17 and the sleeve 18 may be made of a non-magnetic material such as aluminum alloys, stainless steel, etc.

Furthermore, to improve the wear resistance of the shafts 13, 15, bush members made of a metal such as stainless steel, etc. may be fitted to journal portions of the shafts 13, 15 around which the bearings 16, 16 are disposed.

The present invention will be described in further detail below by way of Example.

EXAMPLE 1

90 parts by weight of ferrite powder ($SrO.6Fe_2O_3$) having an average particle size of 1 $\mu$m and 10 parts by weight of nylon-12 having a modulus of longitudinal elasticity of $2\times10^4$ kg/cm$^2$ were mixed together by a kneader at 250° C. to prepare a mixture. By using an injection-molding apparatus equipped with the split die 9 shown in FIG. 2, an injection-molding process was performed in such a manner that the mixture was charged through a gate 98 into a cavity 96 at 270° C. and 960 kg/cm$^2$.

The resultant shaped body was taken out of the die 9, and sprues, runners, etc. were removed from the shaped body to obtain a cylindrical resin-bonded magnet 12 having an outer diameter (D) of 14 mm and a length (L) of 224 mm and integrally formed at one end thereof with the first shaft 13 having an outer diameter (d) of 6 mm, as shown in FIGS. 1(a) and 1(b). The cylindrical resin-bonded magnet 12 was formed at the other end thereof with a bore 14 having a diameter of 6 mm. The second shaft 15 separately produced from steel was press-fitted into the bore 14 of the cylindrical resin-bonded magnet 12. The magnet roll 11 thus obtained was placed in a magnetic field to provide eight (8) magnetic poles symmetrically on an outer surface thereof. A magnetic flux density of the magnet roll 11 was 750 G when measured at an outer surface of the sleeve 18 having an outer diameter of 16 mm.

Five hundreds magnet rolls were prepared in the same manner as mentioned above and observed as to whether cracking or breakage took place. As a result, it was observed that the magnet rolls had no cracking and breakage.

Next, the sleeve 18 was mounted to the magnet roll 11 via bearings 16, 16 and flanges 17, 17 to form a developing roll unit as shown in FIG. 3. The developing roll unit was subjected to a continuous rotation test at 120 rpm for 300 hours. After the test, no abnormality was observed, and stable electric conduction was achieved between the shaft 15 and the sleeve 18.

COMPARATIVE EXAMPLE 1

For comparison, the same procedure as in Example 1 was conducted to produce a conventional magnet roll 8 shown in FIG. 4. Namely, the shaft 3 having an outer diameter of 6 mm and made of stainless steel (SUS304) was placed in the die of substantially the same type as shown in FIG. 2. A mixture of ferrite power and nylon-12 prepared in the same manner as in Example 1 was injected into the die to form the cylindrical resin-bonded magnet 2 having an outer diameter of 14 mm and a shaft 3 fixed thereto. Twenty magnet rolls thus produced were subjected to a continuous rotation test and observed with respect to surface conditions. As a result, it was observed that six magnet rolls suffered from cracking.

As described above, since the cylindrical resin-bonded magnet has one shaft integrally formed at one end by injection molding and the other shaft press-fitted into a bore of the cylindrical resin-bonded magnet at the other end in the present invention, the magnet roll having enhanced magnetic properties and improved applicability of a bias voltage to the sleeve can be produced at improved productivity, without suffering from breakage or cracking due to thermal stress, etc.

What is claimed is:

1. A [magnet] *magnetic* roll comprising a cylindrical resin-bonded magnet made primarily of a ferromagnetic powder and a thermoplastic resin having a modulus of longitudinal elasticity of [$1\times10^5$ kg/cm$^2$] *at least* $2\times10^4$ *kg/cm*$^2$, a first shaft formed by injection molding integrally with said cylindrical resin-bonded magnet at one end thereof, and a second shaft made of a rigid conductive material and press-fitted into a bore of said cylindrical resin-bonded magnet at the opposite end thereof.

2. The [magnet] *magnetic* roll according to claim 1, wherein said bore has a splined cross section, and said second shaft is provided with a base portion having a splined cross section complimentary to that of said bore, said base portion being inserted into said bore.

3. The [magnet] *magnetic* roll according to claim 1, wherein said ferromagnetic powder is made of at least one selected from the group consisting of barium ferrite, strontium ferrite, a rare earth-cobalt alloy and a rare earth-iron-boron alloy.

4. The [magnet] *magnetic* roll according to claim 1, wherein said thermoplastic resin is at least one selected from the group consisting of nylon-6, nylon-12 and nylon-66.

5. The [magnet] *magnetic* roll according to claim 1, wherein said second shaft is made of steel.

6. A method of producing a [magnet] *magnetic* roll composed of a cylindrical resin-bonded magnet made of a ferromagnetic powder and a thermoplastic resin having a modulus of longitudinal elasticity of [$1\times10^5$ kg/cm$^2$] *at least* $2\times10^4$ *kg/cm*$^2$, and first and second shafts concentrically projecting from opposite ends of said resin-bonded magnet, comprising the steps of:

(a) mixing said ferromagnetic powder with said thermoplastic resin to prepare a mixture;

(b) charging said mixture into an injection-molding die to produce an integrally shaped body of said cylindrical resin-bonded magnet having a first shaft concentrically projecting from one end thereof and a bore at the other end thereof;

(c) removing said integrally shaped body from said injection-molding die;

(d) press-fitting a separately prepared second shaft made of a rigid conductive material into said bore of said cylindrical resin-bonded magnet; and (e) placing said cylindrical resin-bonded magnet in a magnetic field to form a plurality of magnetic poles on an outer surface of said cylindrical resin-bonded magnet.

7. The method according to claim 6, wherein said bore has a splined cross section, and said second shaft is provided with a base portion having a splined cross section complimentary to that of said bore, said base portion being inserted into said bore.

8. The method according to claim 6, wherein said ferromagnetic powder is made of at least one selected from the group consisting of barium ferrite, strontium ferrite, a rare earth-cobalt alloy and a rare earth-iron-boron alloy.

9. The method according to claim 6, wherein said thermoplastic resin is at least one selected from the group consisting of nylon-6, nylon-12 and nylon-66.

10. The method according to claim [1] *6* wherein said second shaft is made of steel.

*11. The magnetic roll according to claim 1, wherein thermoplastic resin more specifically has a modulus of longitudinal elasticity of at least* $1\times10^5$ *kg/cm*$^2$.

*12. The method according to claim 6, wherein thermoplastic resin more specifically has a modulus of longitudinal elasticity of at least* $1\times10^5$ *kg/cm*$^2$.

*13. The magnetic roll according to claim 1, wherein said thermoplastic resin is a polyamide.*

*14. The magnetic roll according to claim 13, wherein said polyamide is at least one selected from the group of nylon-6, nylon-12 and nylon-66.*

*15. The magnetic roll according to claim 1, wherein said thermoplastic resin has a modulus of longitudinal elasticity ranging from* $2\times10^4$ *kg/cm*$^2$ *to* $1\times10^5$ *kg/cm*$^2$.

*16. The method according to claim 6, wherein said thermoplastic resin is a polyamide.*

*17. The method according to claim 16, wherein said polyamide is at least one selected from the group of nylon-6, nylon-12 and nylon-66.*

*18. The method according to claim 6, wherein said thermoplastic resin has a modulus of longitudinal elasticity ranging from* $2\times10^4$ *kg/cm*$^2$ *to* $1\times10^5$ *kg/cm*$^2$.

*19. A magnetic roll comprising a cylindrical resin-bonded magnet made primarily of a ferromagnetic powder and a thermoplastic resin having a modulus of longitudinal elasticity of* $1\times10^5$ *kg/cm*$^2$ *or higher, a first shaft formed by injection molding integrally with said cylindrical resin-bonded magnet at one end thereof, and a second shaft made of a rigid conductive material and press-fitted into a bore of said cylindrical resin-bonded magnet at the opposite end thereof.*

*20. A method of producing a magnet roll composed of a cylindrical resin-bonded magnet made of a ferromagnetic powder and a thermoplastic resin having a modulus of longitudinal elasticity of* $1\times10^5$ *kg/cm*$^2$ *or higher, and first and second shafts concentrically projecting from opposite ends of said resin-bonded magnet, comprising the steps of:*

*(a) mixing said ferromagnetic powder with said thermoplastic resin to prepare a mixture;*

*(b) charging said mixture into an injection-molding die to produce an integrally shaped body of said cylindrical resin-bonded magnet having a first shaft concentrically projecting from one end thereof and a bore at the other end thereof;*

*(c) removing said integrally shaped body from said injection-molding die;*

*(d) press-fitting a separately prepared second shaft made of a rigid conductive material into said bore of said cylindrical resin-bonded magnet; and*

*(e) placing said cylindrical resin-bonded magnet in a magnetic field to form a plurality of magnetic poles on an outer surface of said cylindrical resin-bonded magnet.*

* * * * *